April 9, 1968     R. CORINALDI     3,377,474

HAND MIRROR FOR WOMEN

Filed Aug. 23, 1965

INVENTOR
RENATO CORINALDI

BY *Ernest G. Montague*

ATTORNEY.

United States Patent Office 3,377,474
Patented Apr. 9, 1968

3,377,474
HAND MIRROR FOR WOMEN
Renato Corinaldi, Via G. Parini 3/a, Milan, Italy
Filed Aug. 23, 1965, Ser. No. 481,529
Claims priority, application Italy, Sept. 30, 1964,
5,249/64
2 Claims. (Cl. 240—4.2)

ABSTRACT OF THE DISCLOSURE

A hand mirror for women comprising a body having a plurality of recesses and a mirror covering at least one side of the body and a frame surrounding the mirror and the body. Electrical elements including an electric bulb and a switch and electrical conduits and battery are disposed in series in the recesses of the body. A clear window is provided in the mirror directly adjacent the electric bulb; the electric bulb and the clear window are positioned centrally relative the mirror and two lateral openings are provided in the mirror spaced on opposite sides of the clear window and are substantially smaller than the clear window. Two of the recesses in the body extend from the electric bulb toward and terminate adjacent the lateral openings and transparent rods having an angular cross-section and having a prismatic optical effect are positioned in each of the two recesses extending from adjacent the electric bulb to the lateral openings, the transparent rods being bent adjacent the lateral openings perpendicular thereto.

---

The present invention relates to a hand mirror for women in general and to a hand mirror having a light source for use either alone or combined with a powder compact or some other toilet article, in particular.

It is one object of the present invention to provide a hand mirror for women which is small and a light source is provided within the limits of the mirror, specifically a small electric bulb with a corresponding electric battery connected by an electric circuit including a switch to the light source.

It is another object of the present invention to provide a hand mirror for women which is disposed in a frame and has a thickness of a few millimeters.

It is yet another object of the present invention to provide a hand mirror for women, the dimensions of which are restricted such that it can be attached to or incorporated in a compact or any other toilet accessory for personal use of women.

With these and other objects in view, which will become apparent in the following detailed description, the present invention will be clearly understood in connection with the accompanying drawings, in which.

Figure 1:
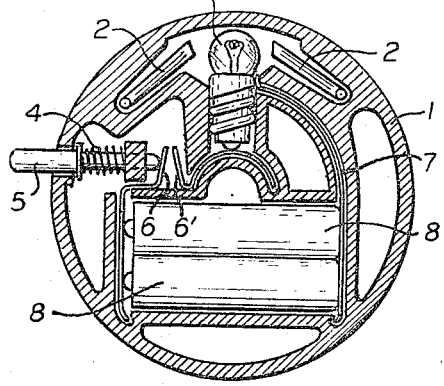
FIGURE 1 is a sectional plan view of a housing carrying the mirror and the electric equipment thereto.
Figure 2:
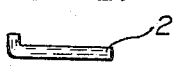
FIG. 2 is an elevation of a reflector constituting a part of the mirror arrangement.
Figure 3:
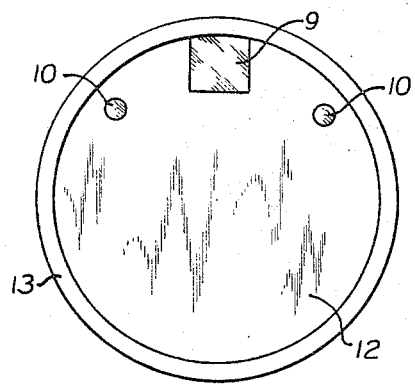
FIG. 3 is a top plan view of the mirror arrangement.
Figure 4:
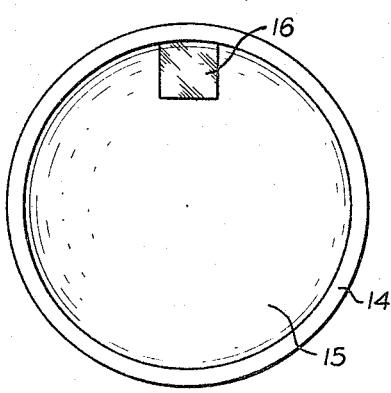
FIG. 4 is a rear plan view of the mirror arrangement disclosed in FIG. 3.
Figure 5:
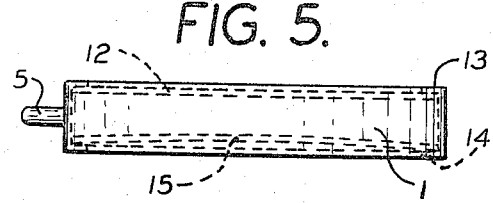
FIG. 5 is an end view of the housing carrying the mirror.

Referring now to the drawing, the mirror arrangement designed in accordance with the present invention comprises an inner body 1 in which the electric parts for illumination are disposed. The latter include a member of insulating material, preferably pressed plastic, in which recesses are arranged to provide the spaces for lighting and the spaces for the electrical parts and the reflecting elements.

A light reflection, in order to expand the amplitude of the light source, is obtained by means of transparent small rods 2 of an angular cross-section and having a prismatic optical effect, aided by other reflecting elements such as mirror plates or surfaces (not shown) which are orientated toward the light generated by an electric bulb 3.

Lighting is rendered operative by a small knob 5 for manual operation against the action of a spring 4 mounted on an extension of the knob 5 of smaller diameter. The knob 5 upon being pushed axially causes contact between metals tabs 6 and 6', extension blades of which engage the terminals of an electric battery 8, and closes the electric circuit from the battery 8 to the bulb 3.

The blades include a metal tab 7, in contact engagement with the electric battery 8 and thus conducts the electric current directly to the bulb 3 while a tab 6, constituting another of the blades, engaging the other terminal of the battery, is switched on, so as to permit lighting at will.

A mirror plane 12 is disposed inside the body 1 at one side thereof, which plane 12 covers all electric parts and a concave mirror 15 is disposed on the opposite side of the body 1.

The body 1 is surrounded by frames 13 and 14 which encase the parts and keep the entire assembly together. The mirror plane 12 has a clear window 9, ground for better diffusion of the light and in addition lateral windows 10, which are reached from the light source by means of the reflecting elements 2. The amplified light source produces better lighting on the person looking into the mirror.

The concave mirror 15 has also a small clear window 16 and is ground.

The two frames 13 and 14 are lightly pressed against the body 1 and held together either by friction or some suitable securing means. By removing the frame 13 and the mirror plane 12, the interior of the body 1 is exposed and thus a change of the electric battery 8 is made possible.

As is apparent, batteries of different types can be used with suitable arrangement of a corresponding recess in the body 1 and the electric contacts according to the type of the battery used.

The drawing represents the mirror approximately in its actual size. It is thus apparent, therefore, that the space occupied by the mirror arrangement is exceedingly limited and differs only slightly from that of a conventional purse mirror.

While I have disclosed one embodiment of the present invention, it is to be understood that this embodiment is given by example only and not in a limiting sense, the scope of the present invention being determined by the objects and the claims.

I claim:
1. A hand mirror for women, comprising
a body having a plurality of recesses,
a mirror covering at least one side of said body,
a frame surrounding said mirror and said body,
electrical elements including an electric bulb, an electric battery, electrical conduits, and a switch disposed in series and received in said recesses of said body,
a clear window in said mirror directly adjacent said electric bulb, said electric bulb and said clear window positioned centrally relative said mirror,
said mirror defining two lateral openings in said mirror spaced on opposite sides of said clear window and substantially smaller than said clear window,
two of said recesses extending from said electric bulb toward and terminating adjacent said lateral openings, respectively,
transparent rods having an angular cross-section and having a prismatic optical effect positioned in each of said two of said recesses extending from adjacent said electric bulb to said lateral openings, and said transparent rods being bent adjacent said lateral openings perpendicular thereto.

2. The hand mirror, as set forth in claim 1, wherein said switch includes a cylindrical knob extending through said frame and body and having a spring operatively connected thereto urging said knob axially away from said mirror in an outwardly extended position, said electrical conduits including two resilient metal tabs located adjacent said knob and spaced apart in a free position when said knob is in said outwardly extended position, and said tabs extending perpendicular to the axis of said cylindrical knob and adapted to be resiliently moved into electrical contact together when said knob is pressed inwardly against said tabs.

References Cited
UNITED STATES PATENTS

| | | | |
|---|---|---|---|
| 2,200,114 | 5/1940 | Konikoff | 240—4.2 |
| 2,678,995 | 5/1954 | Miller | 240—6.45 |
| 2,834,872 | 5/1958 | Esley | 240—4.2 |
| 3,250,908 | 5/1966 | Lawrence et al. | 240—6.45 |
| 3,300,632 | 1/1967 | Kinn | 240—6.45 |

NORTON ANSHER, *Primary Examiner.*

C. L. LOGAN II, J. F. PETERS, JR., *Assistant Examiners.*